Sept. 29, 1953  J. S. McGUIRE  2,653,525
LANDING MAT

Filed Jan. 16, 1950  2 Sheets-Sheet 1

Inventor
John S. McGuire
By Fishburn & Mullendore
Attorneys

Sept. 29, 1953 J. S. McGUIRE 2,653,525
LANDING MAT
Filed Jan. 16, 1950 2 Sheets-Sheet 2

Inventor
John S. McGuire
By Fishburn & Mullendore
Attorneys

Patented Sept. 29, 1953

2,653,525

UNITED STATES PATENT OFFICE 2,653,525

LANDING MAT

John Sargeant McGuire, Kansas City, Kans.

Application January 16, 1950, Serial No. 138,836

4 Claims. (Cl. 94—4)

This invention relates to airplane landing strips or mats and more particularly to panels or mats therefor formed of plastic and fibers and having component parts providing mating members in predetermined patterns of placement.

Various arrangements of perforated, expanded and other formed and/or fabricated metal panels have been used for airstrip landing mats which are laid on a graded or otherwise leveled area. The metal panels are usually relatively heavy and have openings exposing the earth under same to erosion by the air blast of propeller driven aircraft or the back pressure of jet aircraft. Also water passing through apertures in metal panels will soften and weaken the subsoil and undermine portions of the runway as well as make a slick, muddy condition which is disagreeable and dangerous. Metal mats corrode, have load weight ratio limitations which restrict their use, and require considerable material which is relatively critical for other necessities.

The objects of the present invention are to provide a landing mat which eliminates the deficiencies of the metal mats; to provide a landing mat of panels formed of plastic with fibrous reinforcement; to provide a landing mat of a plurality of panels adapted for multilayer application according to load requirements; to provide a landing mat of a plurality of panels fastened together for absorbing or transmitting tension and/or compression loading to the adjacent panel; to provide a landing mat panel with a plurality of recesses in the surface to form an interrupted tread and high friction for the landings, takeoffs and maneuvering of aircraft; to provide panels with protuberances which anchor in the subsoil or seat in recesses of the adjacent panels in multilayer applications to prevent lateral movement of said panels; to provide a landing mat panel of fibrous reinforced plastic having substantially constant ratio between the resin and fibrous reinforcement in all flat and bossed sections; and to provide a landing mat of plastic panels which are economical to manufacture, light in weight, capable of being joined in a strong, durable, rigid, dust-free landing strip, not subject to damage by water, having a high friction landing surface, and adapted to multiple layer application for distribution and absorption of any landing requirements.

In accomplishing these and other objects of the present invention, I have provided improved details of structure, the preferred form of which is illustrated in the accompanying drawings, wherein.

Figure 1:
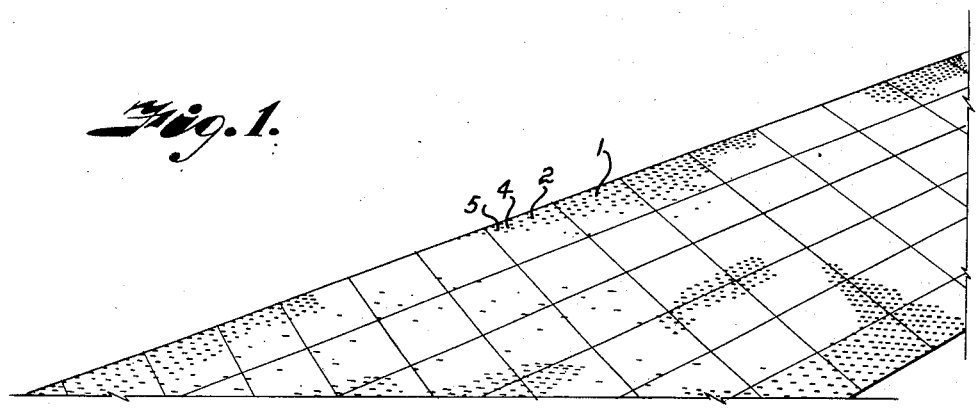
Fig. 1 is a perspective view of a portion of a landing strip formed of a plurality of plastic panels embodying the features of the present invention.

Referring more in detail to the drawings:

1 designates an airstrip formed of a plurality of panels 2 arranged in a close butting relation and suitably connected to provide a continuous strip completely covering the required ground area to make a dust-free construction protecting the ground 3 thereunder against the back pressure of jet aircraft or the blast of propeller-driven aircraft. Each of the panels is preferably formed of suitable resinous plastic with fiber reinforcement such as glass fibres or strands. Phenolic, sterene and what is commonly known as "nylon" are some of the suitable resinous plastics for this purpose. The panels 2 comprise a sheet 4 of suitable thickness and having a substantially flat or plane upper surface 5. A plurality of spaced, cylindrical bosses or protuberances 6 extend downwardly from the lower surface 7 of the sheet 4 and terminate in substantially spherical ends 8. Extending from the upper surface 5 and into each boss is a bore 9 forming walls 10 of the protuberances having substantially the thickness of the sheet 4, said bores 9 terminating as at 11 in spaced relation to the end 8 of said protuberances to provide substantially uniformity of wall thickness throughout the entire structure. Each of the bores 9 is provided with counterbores forming recesses 12 in the upper surface 5 of the panel, said counterbores being spherical. The radii of the counterbores or recesses 12 and the end 8 of the protuberance may be identical and/or the radius of the male sphere forming the end of the boss may be slightly reduced for manufacturing and application tolerance. Also the outer surface of the cylindrical portion of the protuberances 6 and the inner surface formed by the bore 9 may be provided with sufficient draft for efficient molding operations.

The thickness of the material is approximately uniform throughout the flat portions and the walls of the tubular bosses and male spherical portions. This approximate uniformity is provided so as to facilitate the greatest speed and economy in the molding operation. The principal purpose for the uniformity is to maintain a relatively constant ratio between the resin and the fibrous reinforcement. The fibrous reinforcement may be provided in sheet or mat form in a mold and the additional material required for the formation of the protuberances or bosses be provided by means of a slurry or other easily applicable manner, the resinous plastic being applied whereby it fills the interstices between the fibers, pressure being applied to form the fibers and plastic to the shape defined by the mold cavity. The thickness of the material, the height and the spacing of the bosses are all matters of individual application and not factors of basic structural design, however it is preferable to arrange the bosses uniformly in rows. The panels preferably are formed in a geometric shape, for example rectangular, and suitable size for convenience in molding, shipping, handling and placing of same in a landing strip, suitable fastening devices being arranged at the edges for securing the panels in closely abutted relation.

Figure 2:
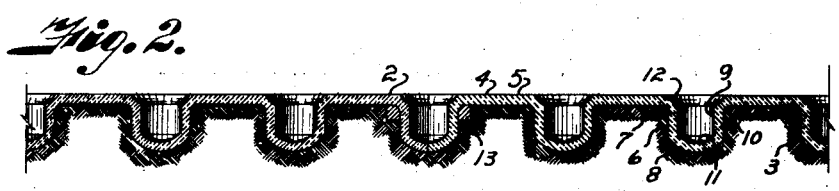
Fig. 2 is a transverse sectional view through adjacent edges of the plastic panels illustrating the protuberances thereon imbedded in the subsoil.
Figure 3:
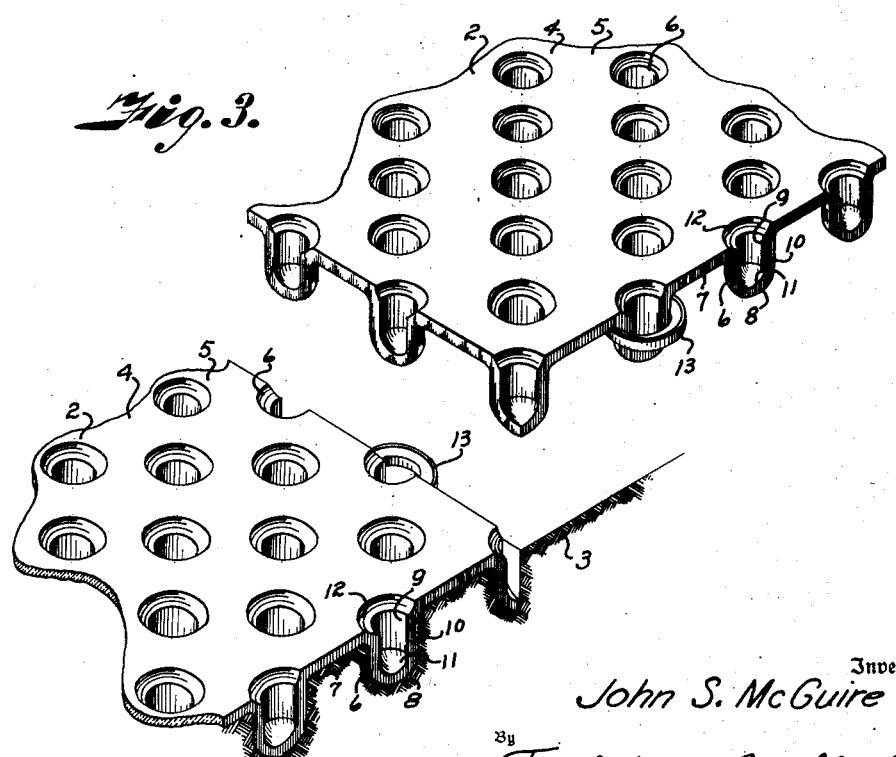
Fig. 3 is a perspective view of portions of adjacent plastic panels in spaced relation illustrating the connecting members thereon.

In the illustrated structure the edges of the panels are arranged in a plane cutting said panel on the axes of a row of bosses as illustrated in Fig. 3 whereby the half-bosses mate with and abut half-bosses of an adjacent panel. One method of securing the adjacent panels together is by means of rings 13 extending around the tubular portions 6 or selected mating half-bosses at the edges of adjacent panels. It is preferable that a plurality of said rings be formed at each edge of the panels and integral therewith to provide a half-circular portion extending outwardly from the edge thereof to receive and closely engage the half-section of a mating boss on an adjacent panel as illustrated in Fig. 2. With this arrangement with the panels used in a single layer as illustrated in Fig. 2 the bosses are imbedded or anchored in the subsoil 3 and the tension and compression loading is absorbed or transmitted to the adjacent panel by means of the ring fasteners. Obviously loose rings and/or other suitable fasteners could be used to retain the panels in abutting condition and transmit or absorb stresses imparted thereto.

Figure 4:
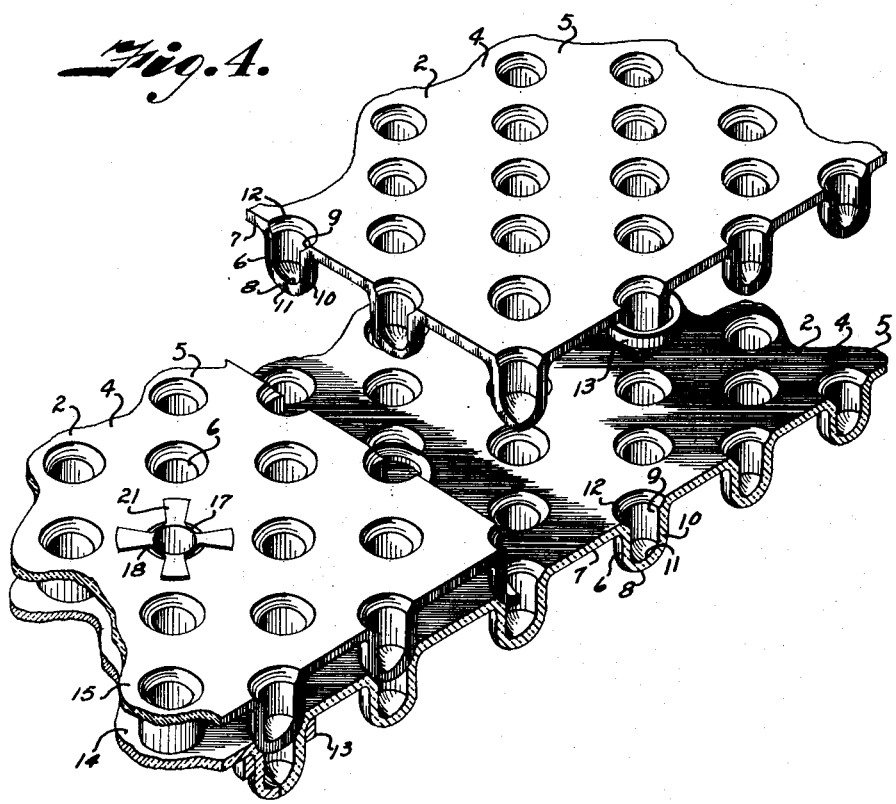
Fig. 4 is a perspective view of a portion of the landing strip illustrating the arrangement of the panels for multilayer application.
Figure 5:
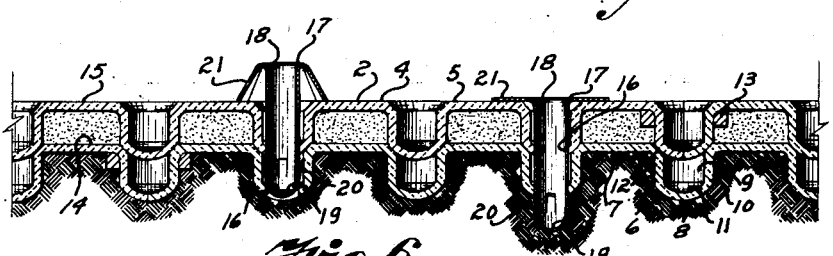
Fig. 5 is a transverse sectional view through a portion of a multilayer airstrip illustrating the vertical fastening devices therefor.
Figure 6:
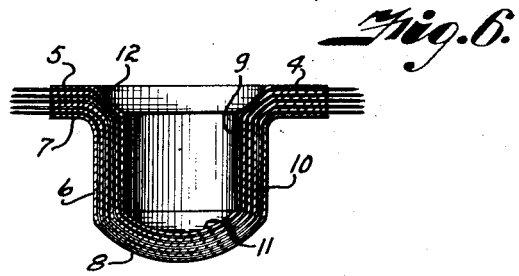
Fig. 6 is an enlarged sectional view through a portion of the plastic panels illustrating the fibrous reinforcing therein.

The thickness of the walls of the panel and bosses thereon and the height and spacing of the bosses may be varied to provide various beam effects to increase or decrease the ability of the panel to withstand impact and other loadings according to the requirements. In some instances the loading requirement may indicate a multilayer application of the panel in order to properly distribute the landing stresses. Such an arrangement is shown in Figs. 4 and 5. The same panels are used and similiar connecting means may be used for holding the panels in horizontal abutting relation. However, in such a case, it is necesssary to fasten the layers vertically. Therefore fasteners acting in a vertical plane need be of such nature as to contain the resultant component of the transverse shear and/or compression developed in the adjacent portions of the landing strip at the time of the impact loading thereof. For example, in uses of landing mats with plastic subsoil conditions where the impact loadings of landing aircraft may develop loadings of two and one-half times gravity, the service requirements may indicate a three-layer or four-layer application of the panels in order to properly distribute the landing stress. The fasteners need to be of such nature as to contain the vertical component of the horizontal thrust resulting after the gravitational effect of the landing impact is absorbed. All loadings perpendicular to the plane of the panel tend to increase the rigidity of the structure by causing more intimate contact between the spherical surface of the protruding bosses and the female recess so that whatever conventional fastener is used, it need only absorb the resultant perpendicular component of the thrust of the impact.

In the multilayer application of the panels, a single layer 14 of panels is arranged on the ground with the bosses imbedded therein in the same manner as using a single panel application for the strip. A second layer 15 of panels is then placed on the first layer with spherical ends 8 of the protuberances 6 of the upper layer seating in the spherical recesses 12 of the panels of the lower layer, the abutting edges of the upper panels being spaced longitudinally and transversely or otherwise offset from the edges of the panels of the lower layer whereby no two edges are in the same vertical plane. When the desired number of panels are arranged in the multilayer application, selected aligned bores 3 are arranged for application of suitable fastening devices, for example apertures 16 may be provided in the ends of the bosses and fastening devices 17 inserted therethrough to provide a shake-proof or equivalent spring lock.

The fastening devices illustrated consist of tubular member 18 having closed lower ends 19. Spaced above the lower ends 19 are inverted U-shaped cuts in the tubular member 18 to form spring tabs 20 the upper portion of which tend to move outwardly from the member 18. The tubular member 18 terminates above the tabs 20 at a distance substantially equal to the height from the lower end of the boss on the lowermost panel to the upper surface of the uppermost panel and terminates in outwardly and downwardly directed spring member 21 whereby when the fastening device is pressed downwardly through the bores 16, the tabs 20 will spring outwardly to engage the lower end of the boss of the lowermost panel and the member 21 will spread outwardly and engage the upper surface 5 of the uppermost panel to provide spring tension tending to hold the respective panels engaged with the adjacent panel and the spherical portions of the male bosses seated in the female recesses 12 and this engagement of the spherical portions transmits the shear loads or stresses regardless of the plane of deflection of the panels. With this arrangement the spherical recesses 12 in the face 5 of the upper panel provides an interrupted tread and consequently high friction for the landings, takeoffs and maneuvering of aircraft, and the protruding bosses of the lower panels anchor into the subsoil and prevent lateral movement of the panels. Placement of the panels in close abutting position and joining the panels by means of the circular or other suitable fastening devices provides a continuous strip completely covering the ground, making a dust-free panel against the back pressure of jet aircraft or the blast of propeller driven aircraft.

In multiple layer application, sand or other heavy material may be placed in the intervening spaces between the panels to provide displacement weight against flotation by tidal or overflow water, and in the event of heavy rain water will tend to flow over the upper surface and will not undermine or damage the subsoil beneath the panels. Therefore in wet weather the recesses in the upper surface will provide traction for the wheels of the landing aircraft and the impact of the wheels on the panels will not cause mud or dirty water to fly up and interfere with the vision of the pilot or cause a slick condition on the landing surface.

It is believed obvious that this landing mat provides a strong, durable landing strip of relatively light weight adaptable for various arrangements and application to accommodate any impact loading and eliminate the erosion of the subsoil thereunder.

What I claim and desire to secure by Letters Patent is:

1. A mat for aircraft landing strips consisting of a panel of fibrous reinforced resinous plastic having a flat upper surface, spaced hollow bosses integral with and depending from the opposite surface of said panel, the bosses terminating in closed spherical ends, the panel and walls of the bosses being substantially uniform in thickness, spherical recesses in the upper surface of the panel coaxial with the bores, a plurality of equally spaced boss segments along edges of and depending from the panel, the spacing of said boss segments corresponding to the spacing of the bosses on the panel, and ring members on selected boss segments of said panel and extending therefrom for receiving complemental boss segments of adjacent panels to secure the panel thereto in edge abutting relation.

2. An aircraft landing strip comprising, a plurality of panels of fibrous reinforced resinous plastic arranged in edge abutting relation, said panels having coplanar upper surfaces, a plurality of spaced bosses integral with said panels and depending therefrom, said bosses each terminating in a spherical end, said panels having spherical recesses in the upper face coaxial with each of the bosses, said bosses having coaxial bores therein, the walls of the panels and bosses being substantially of uniform thickness, a plurality of equally spaced boss segments along edges of and depending from the panels, the spacing of said boss segments corresponding to the spacing of the bosses on the panels and being complemental to boss segments of adjacent panels, means on selected boss segments of each panel and extending therefrom for receiving complemental boss segments of adjacent panels to secure said panels in edge abutting relation and prevent relative horizontal movement thereof.

3. An aircraft landing strip comprising, a plurality of layers of panels of fibrous reinforced resinous plastic, the panels of each layer being arranged in edge abutting relation with the panel edges of one layer offset from the edges of the next adjacent layer, said panels in each layer having coplanar upper surfaces, a plurality of spaced bosses in spaced rows integral with said panels and depending therefrom and terminating in spherical ends, said panels each having spherical counterbored recesses in the upper face coaxial with each of the bosses, said recesses seating the spherical ends of the bosses of the panels in the next adjacent upper layer, selected axially aligned bosses of the respective layers having axial apertures, and fastening means extending through the aligned apertures and having portions resiliently engaging the surface of the upper layer of panels and the under surface of the respective boss of the lowermost layer of panels to secure same against relative vertical movement and resiliently retain the spherical ends of the bosses seated in the spherical counterbored recesses of the next lower layer of panels for transmitting stress therebetween.

4. An aircraft landing strip comprising, a plurality of layers of panels of fibrous reinforced plastic, the panels of each layer being arranged in edge abutting relation with the panel edges of one layer offset from the panel edges in the next adjacent layer, said panels in each layer having coplanar upper surfaces, a plurality of equally spaced bosses in spaced rows integral with said panels and depending therefrom, said bosses each having an upwardly opening coaxial bore whereby the walls of the panels and bosses are substantially of uniform thickness, said bosses terminating in spherical ends, said panels having spherical counterbored recesses in the upper faces thereof coaxial with each of the bosses, said recesses seating spherical ends of the bosses of the panels in the next adjacent upper layers for transmission of shear stresses therebetween regardless of deflection of said panels, a plurality of equally spaced boss segments along edges of and depending from the panels, the spacing of said boss segments corresponding to the spacing of the bosses on the panels and being complemental to boss segments of adjacent panels, means on selected boss segments of each panel and extending therefrom for receiving complemental boss segments of adjacent panels of the same layer to secure said panels in edge abutting relation and prevent relative horizontal movement thereof, selected axially aligned bosses of the respective layers having axial apertures, and fastening means extending through the aligned apertures and having portions resiliently engaging the surface of the upper layer of panels and the under surface of the respective boss of the lowermost layer of panels to secure same against relative vertical movement and resiliently retain the spherical ends of the bosses seated in the spherical counterbored recesses of the next lower layer of panels for transmitting stress therebetween.

JOHN SARGEANT McGUIRE.

References Cited in the file of this patent

UNITED STATES PATENTS

| Number | Name | Date |
|---|---|---|
| 363,353 | Baker | May 24, 1887 |
| 1,987,147 | Gross | Jan. 8, 1935 |
| 2,052,984 | Madison | Sept. 1, 1936 |
| 2,294,550 | Greulich | Sept. 1, 1942 |
| 2,391,997 | Noble | Jan. 1, 1946 |